United States Patent
Groth et al.

(10) Patent No.: US 7,182,559 B1
(45) Date of Patent: Feb. 27, 2007

(54) RACK FOR HOLDING PLATE GLASS AND OTHER PLANAR ARTICLES

(75) Inventors: Charles E. Groth, Northfield, MN (US); Jeremy J. Raabolle, Northfield, MN (US); Michael E. Terry, Northfield, MN (US)

(73) Assignee: C.G. Industrial Equipment Inc., Northfield, MN (US)

( * ) Notice: Subject to any disclaimer, the term of this patent is extended or adjusted under 35 U.S.C. 154(b) by 0 days.

(21) Appl. No.: 11/478,923

(22) Filed: Jun. 30, 2006

(51) Int. Cl.
*B60P 7/08* (2006.01)

(52) U.S. Cl. .................. 410/32; 410/35; 410/43; 410/46; 410/87

(58) Field of Classification Search ........... 410/31, 410/32, 35, 43, 46, 87, 88; 296/3; 211/72, 211/169, 198, 41.1, 41.14, 41.15; 206/451, 206/454
See application file for complete search history.

(56) References Cited

U.S. PATENT DOCUMENTS

| | | |
|---|---|---|
| 619,237 A | 2/1899 | Soulé |
| 2,884,136 A | 4/1959 | Leighton |
| 2,946,453 A | 7/1960 | Pityo |
| 2,953,253 A | 9/1960 | Henderson et al. |
| 3,047,142 A | 7/1962 | Heffley |
| 3,147,860 A | 9/1964 | Kean, Sr. et al. |
| 3,193,093 A | 7/1965 | Hansen |
| 3,199,709 A | 8/1965 | Morrison et al. |
| 3,402,845 A | 9/1968 | Eriksson |
| 3,645,387 A | 2/1972 | Hunt |
| 3,655,034 A | 4/1972 | Stollman et al. |
| 3,887,071 A | 6/1975 | Thomaswick |
| 3,913,965 A | 10/1975 | Muller et al. |
| 3,955,676 A | 5/1976 | Hansen et al. |
| 4,093,251 A | 6/1978 | Boyer |
| 4,177,907 A | 12/1979 | Funaioli et al. |
| 4,202,452 A | 5/1980 | McCormick |
| 4,278,171 A | 7/1981 | Millhoan |
| 4,467,922 A | 8/1984 | Rowley |
| 4,512,473 A | 4/1985 | Thomaswick et al. |
| 4,619,368 A | 10/1986 | Kappelt, Jr. |
| 4,733,781 A | 3/1988 | Gerlach |
| 4,785,936 A | 11/1988 | Shpigelman |
| 4,836,379 A | 6/1989 | Shaw |
| 4,934,538 A | 6/1990 | Beyer |
| 5,101,976 A | 4/1992 | Salisbury |
| 5,145,073 A | 9/1992 | Kitagawa et al. |
| 5,439,716 A | 8/1995 | Larsen |
| 5,676,066 A | 10/1997 | Cavalier et al. |
| 5,685,437 A | 11/1997 | Lisec |

(Continued)

*Primary Examiner*—Stephen Gordon
(74) *Attorney, Agent, or Firm*—Thomas J. Nikolai; Nikolai & Mersereau, P.A.

(57) ABSTRACT

A rack for transporting and storing glass panels. The rack is designed to protect the panels during shipment so that they do not become damaged. The rack includes a base associated with two sets of channels in which a plurality of glass panels can be placed. Each channel has at least one gripper member associated with it. The gripper member is pivotal between a first position in which panels are locked in place in the channels and a second unlocked position in which panels can be inserted into or removed from the channels. Two sets of such channels are provided such that the rack of the present invention can be used to hold one set of longer glass panels or two separate sets of shorter glass panels.

9 Claims, 6 Drawing Sheets

U.S. PATENT DOCUMENTS 5,803,257 A     9/1998   Bartholomew
5,813,536 A     9/1998   Bartholomew
6,102,206 A     8/2000   Pride
6,588,605 B1 *  7/2003   Volkert et al.
6,626,619 B1 *  9/2003   Exnowski et al. ............ 410/35
2005/0201841 A1 * 9/2005 Summers ..................... 410/32

* cited by examiner

RACK FOR HOLDING PLATE GLASS AND OTHER PLANAR ARTICLES

BACKGROUND OF THE INVENTION

I. Field of the Invention

This invention relates generally to an apparatus for transporting panels of material, and more particularly to a rack for protecting panels of material, such as glass sheets, during shipment so that they do not become broken, scratched, or otherwise damaged.

II. Discussion of the Prior Art

For many years, packaging and support frame designs for securing glass panels and the like during shipping have been commonly used. Shipping containers utilizing a number of parallel rods spaced apart from one another were known to be used in "harp" type racks. These types of containers had limited use and typically provided little protection against bumps and sudden movements during shipment.

Other basic shipping containers were developed which used a configuration with a base and an upright wall having a plurality of slots that were used together with a number of elastic restraints. These restraints were used to help secure panels but were required to be individually secured and released. Still other arrangements included devices that used pairs of padded rails that could be pulled together with a handle and locked in place using a wing nut or screw to clamp the glass plates therebetween.

Recently, prior art designs include containers using a base and an upright side wall containing aligned slots, as in U.S. Pat. No. 6,588,605 to Volkert et al. That design places a glass plate in slots formed in bottom and side member sand has a floor with separate metal plates, some of which are stationary and others that are slidable, such that the slidable metal plates can move between a locked and an unlocked position. In the locked position, the edges of a groove in the movable plates engage and force the glass panels into the walls of the groove of the stationary plates and thus lock the panels in place.

Despite a range of combinations of stationary members and moveable members for locking and unlocking glass panels that are previously known, none of these arrangements provides the capability and flexibility of storing multiple sets of glass panels independently. Moreover, a simplified assembly from such previous devices for locking glass panels in place is needed. A shipping container which more effectively holds the glass panels and that is easy to maneuver and stack by forklifts during shipment, transportation and storage is also desired.

Therefore, a need exists for an improved rack assembly enabling one to more effectively and safely transport panels of glass and the like.

SUMMARY OF THE INVENTION

The present invention provides a rack assembly designed to be loaded into and removed from a transport vehicle that is especially designed to hold sheets of glass or similar fragile sheets to inhibit breakage.

The rack assembly of the present invention includes a generally rectangular base comprising a pair of side rails that are held in parallel, spaced-apart relation by a pair of end rails, these rails preferably being formed from cold rolled steel or aluminum. Affixed to the upper surface of the base and extending across the width dimension thereof are parallel ribs of generally U-shaped cross-section and disposed between adjacent pairs of such ribs are U-shaped channels containing a plurality of fixed and a plurality of movable plates defining parallel, longitudinally extending gaps therebetween. A crank-operated linkage mechanism is coupled to the parallel, movable plates and, when rotated in a first direction, causes the gap between adjacent plates to close and when rotated in the opposite direction reopens the gap between adjacent plates.

The base assembly also supports first and second A-frame assemblies proximate opposed ends thereof. The A-frame assemblies include first and second frame members that are hinged together along a top edge thereof and where one of the panel members is hinged to the base in such a fashion that the A-frame assemblies can be folded down to lie flat relative to the base assembly when not in use or may be made to stand erect with the frame members projecting upward from the base assembly.

The panels comprising the A-frame members include a plurality of rods disposed in parallel, spaced-apart relation where the distance between adjacent rods is generally equal to the spacing between the adjacent movable plates.

In this arrangement, a plurality of glass sheets can be inserted, one at a time, through the aligned gaps in one or both of the A-frame assemblies and with the lower edges of the glass sheets residing in the gaps between adjacent movable plates when those plates are in their open position. Once all of the glass sheets have been inserted into the rack assembly, the crank can be actuated to move the movable plates so that they effectively pinch the lower edge portions of the glass sheets to prevent those glass sheets from movement relative to the rack assembly in which they are contained.

These and other objects, features and advantages of the present invention will become readily apparent to those skilled in the art through a review of the following detailed description in conjunction with the claims and accompanying drawings in which like numerals in the several views refer to the same corresponding parts.

DESCRIPTION OF THE PREFERRED EMBODIMENT

Figure 1:
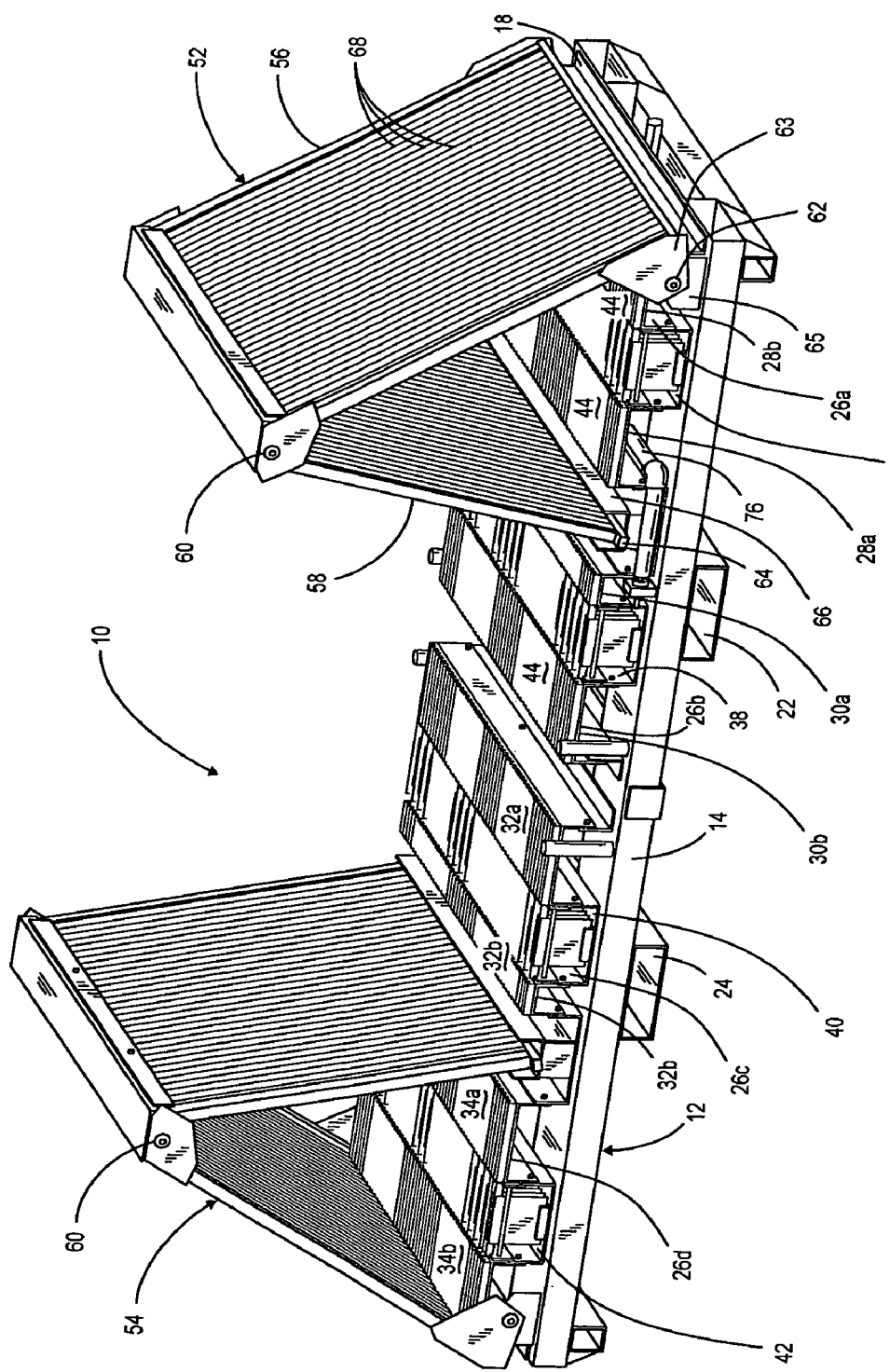
FIG. 1 is a perspective view of the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

The present invention describes broadly applicable improvements for a rack assembly for storing and transporting fragile sheet material, such as plate glass or the like, to inhibit breakage during handling and movement thereof. The embodiments herein are intended to be taken representative of those in which the invention may be incorporated and are not intended to be limiting.

Referring first to FIG. 1, there is shown a perspective view of a rack assembly designed to contain a plurality of glass sheets, on-edge, in a parallel, spaced-apart, non-contact relationship. The rack assembly 10 includes a base assembly 12 having parallel, spaced-apart side channels 14 and 16 plainly visible in the bottom view of the base illustrated in FIG. 3. Holding the side channels 14 and 16 in spaced relationship are end rails 18 and 20 and intermediate channels 22 and 24.

The lateral spacing between the channels 22 and 24 is designed to accommodate the spacing between forks on a conventional fork lift or pallet jack. Likewise, the spacing between the side channels 14 and 16 is also set to receive fork-lift forks therein so that the rack assembly can be lifted from either end or from either side of the base.

Referring again to FIG. 1, there is shown bolted to the side channels 14 and 16 a set of four cross ribs 26a–26d, where each set includes a pair of inverted channels 28a, 28b, 30a, 30b, 32a, 32b, and 34a and 34b. The inverted channels are spaced apart from one another to define upwardly facing channels 36–42. As seen in FIG. 1, the channels 26a, 28a and 36 may be formed from a single piece of sheet metal appropriately bent in a metal break to define the individual channels, such as 26a, 36 and 28a and the remaining three rib assemblies 26a–26d.

Figure 2:
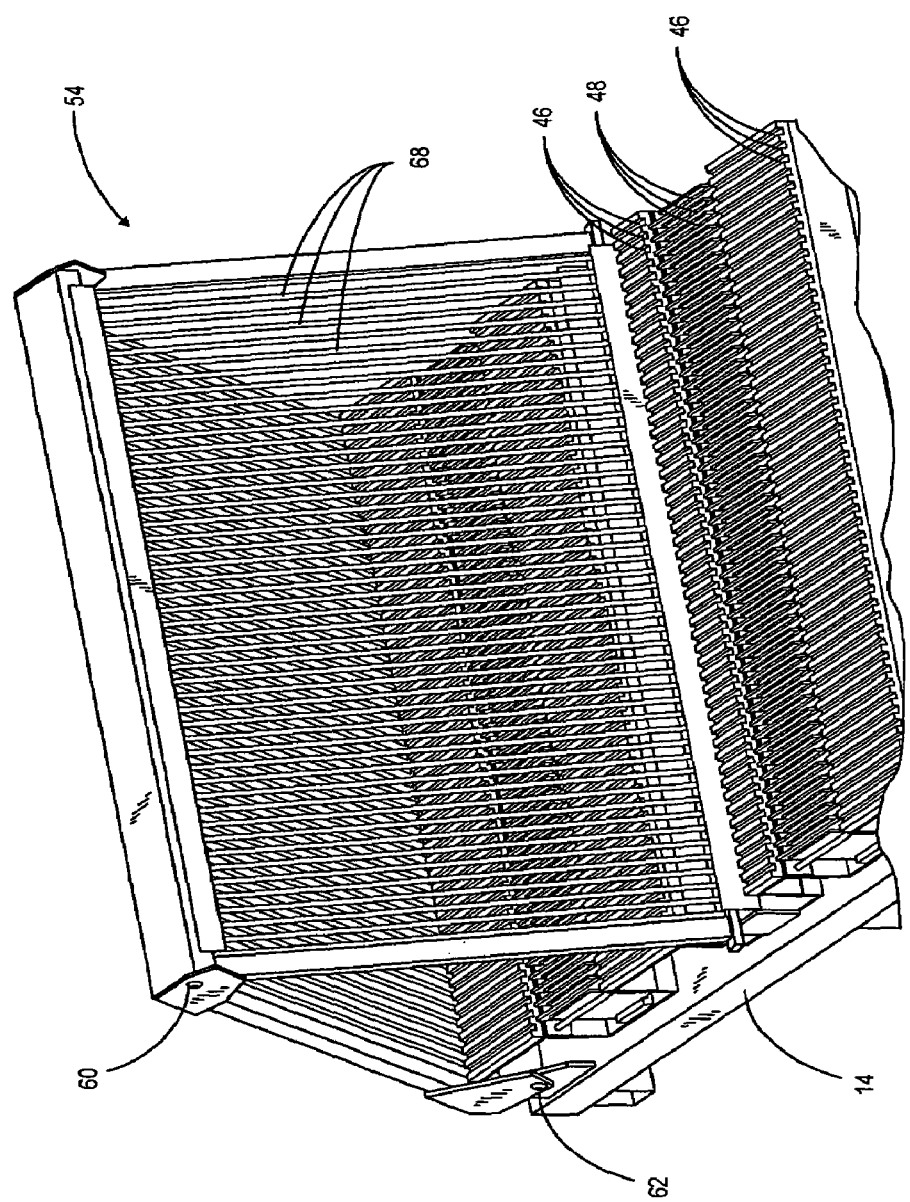
FIG. 2 is a partial perspective view taken from the left, showing the A-frame assembly in greater detail.

The exposed upper surface of the channels 28a, 28b, 30a, 30b, 32a, 32b and 34a, 34b have a sheet of cushioning material bonded thereto as at 44, the cushioning material preferably comprising a layer of nylon plastic having longitudinally aligned, parallel grooves 46 as may be seen in the detailed view of FIG. 2.

Figure 6:
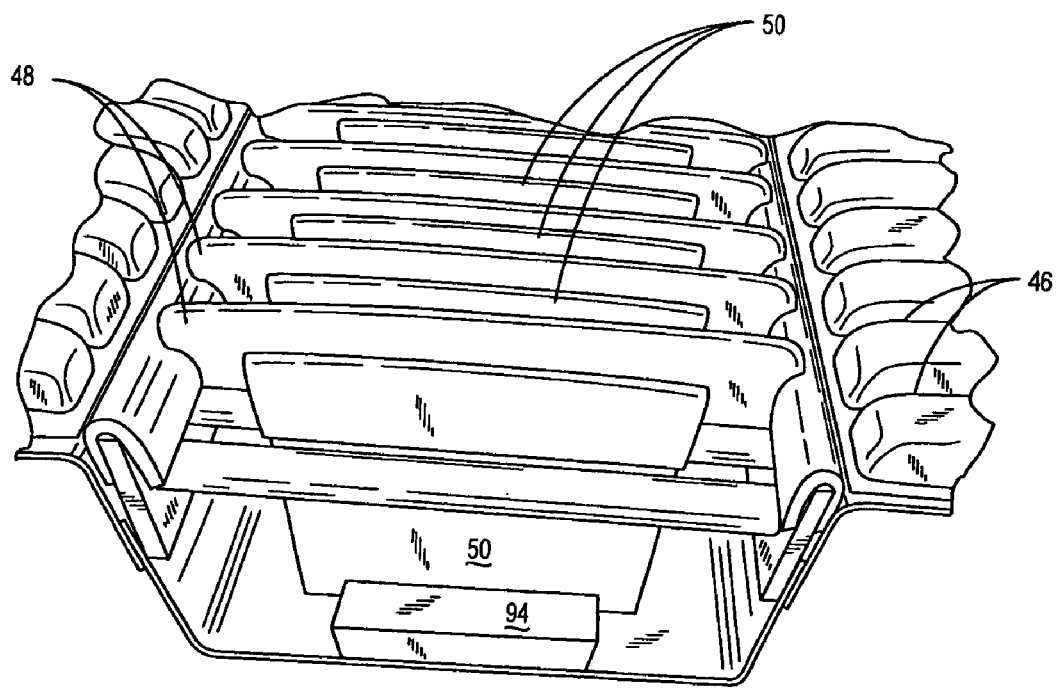
FIG. 6 is a perspective view of the gripper members disposed in a channel supported by rack's base.

Disposed in the upwardly facing channels 36, 38, 40 and 42 are sets of fixed plates and movable plates where a movable plate is disposed in a gap between adjacent fixed plates. This arrangement is best seen in the detailed view of FIG. 6. In FIG. 6, the fixed plates are identified by numeral 48 and the movable plates by numeral 50. As will be described in greater detail herein below, a linkage mechanism is provided for causing the movable plates to move in unison from a first position where a gap exists between the fixed plates and the movable plates to a second position where the gap is narrowed. The fixed plates and the upper edge portion of the movable plates have a coating of an elastomeric material, such as polyethylene adhered thereto.

Referring again to FIG. 1, it may be seen that the base 12 also supports a pair of A-frame assemblies 52 and 54. The A-frame assembly 52 includes a first frame member 56 and a second frame member 58, the two being hinged together along top edges of each by a hinge pin 60. The lower edge of frame member 56 is hinged to the base 12 by a hinge pin 62 passing through a hinge plate 63 welded to the frame member 56 and an ear 65 welded to the base side rail 14. The lower edge 64 of the frame member 58 is shown in FIG. 1 to be captured in a channel 66. By lifting the edge 64 out from the channel 66 and tucking it close to the hinge pin 62, the A-frame assembly 52 can be folded down to lie flat atop the surfaces 44 when the rack assembly is not being used for handling glass panels or the like.

Each of the frame members 56 and 58 supports a plurality of parallel, longitudinally extending rods, as at 68, where the spacing between adjacent rods is generally aligned with the grooves 46 in the cushion members 44 which, in turn, are aligned with the gaps between adjacent fixed plates 48. This arrangement can better be seen in the partial, detailed view of FIG. 2 showing the construction of the A-frame assemblies.

In that the construction of A-frame assembly 54 is generally identical to that of A-frame assembly 52, a further description of its construction and ability to be folded down onto the base is deemed unnecessary.

Figure 3:
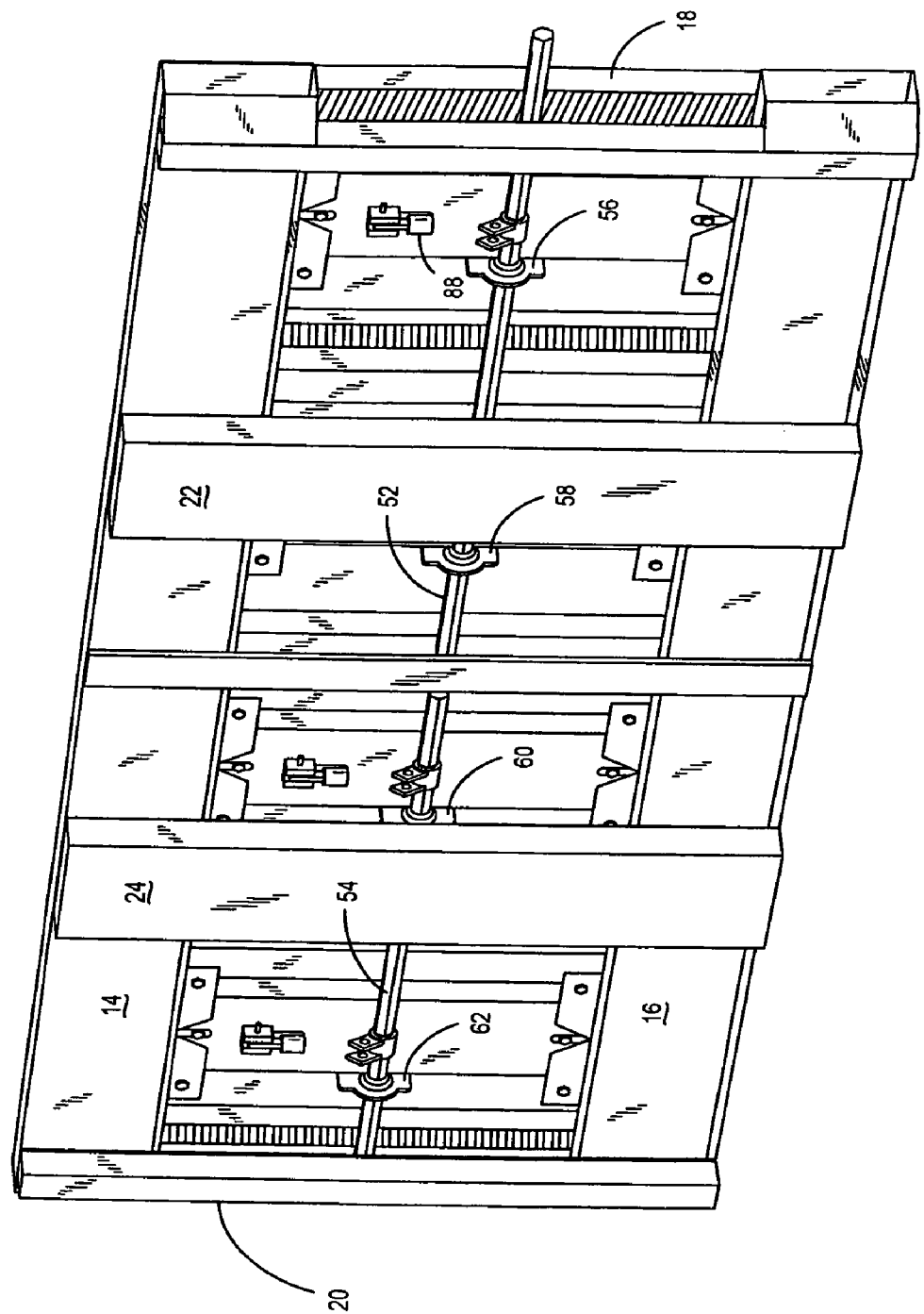
FIG. 3 is a bottom view of the rack assembly.
Figure 4:
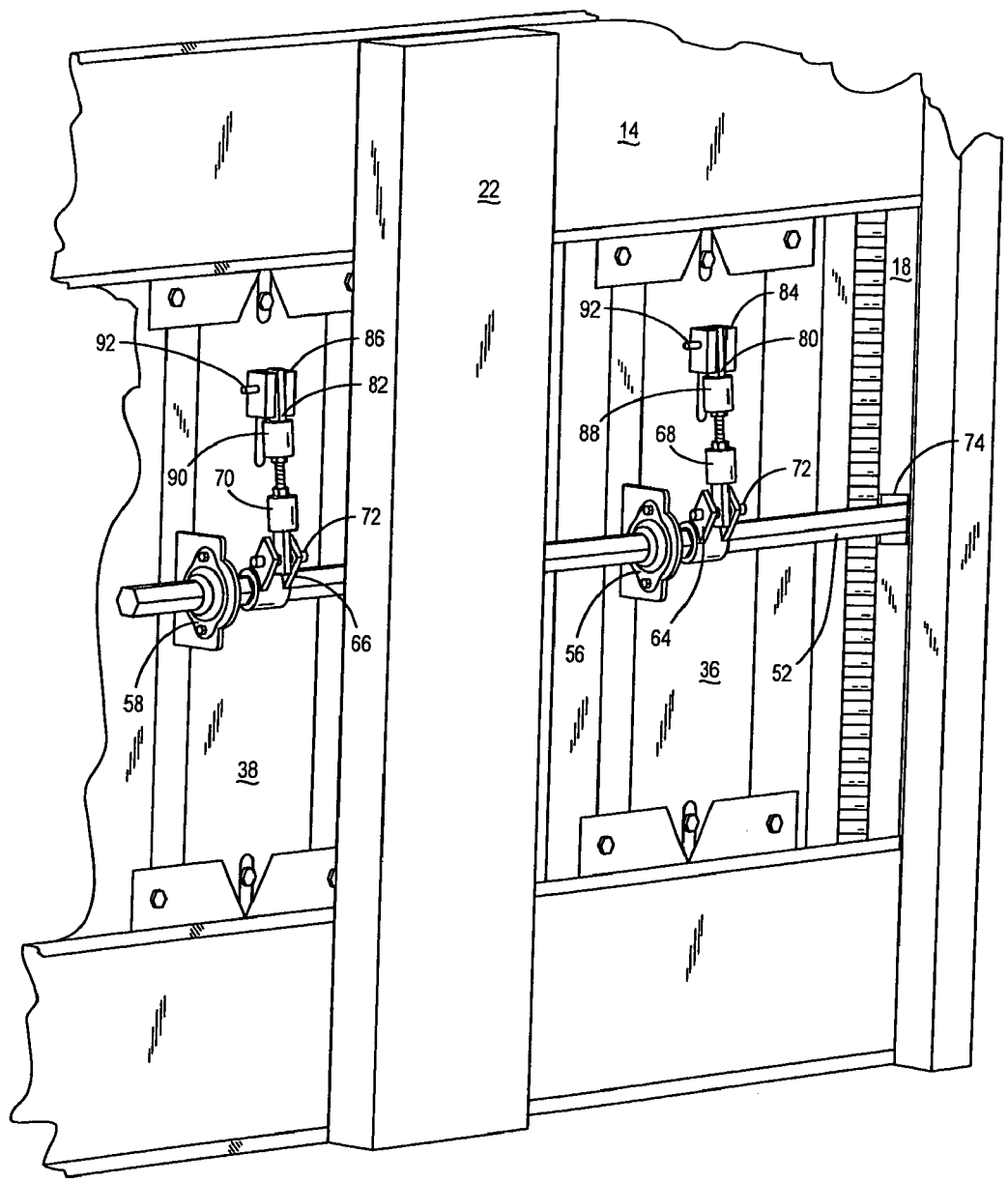
FIG. 4 is a more detailed bottom view of the right side of the glass transporting rack.

Referring once again to FIG. 3 showing the underside of the base assembly, there can be seen first and second shafts 52 and 54, each of which is journaled for rotation by bearings, the shaft 52 being journaled by bearings 56 and 58 and the shaft 54 by bearings 60 and 62. The shaft 52 extends from the right end 18 of the base to a location proximate the member 30b and the shaft 54 extends from the left end 20 to a location beneath the channel 32a. Missing from the view of FIG. 3 are the linkages that are actuated by rotation of the shafts 52 and 54, but these linkages can be seen in FIG. 4. As can be seen in FIG. 4, the shaft 52 has a hex cross-section and mounted thereon and rotatable therewith are clevis members 64 and 66 having parallel, spaced apart legs straddling arms 68 and 70, respectively. Shoulder bolts, as at 72, extend through aligned holes in the clevis members 64 and 66 and through the arms 68 and 70, effectively converting rotation movement of the shaft 52 into a linear displacement of the arms 68 and 70.

As seen in FIG. 4, the shaft 52 passes through an aperture 74 in the right end 18 of the base member 12 allowing a crank 76 (FIG. 5) having a hex socket 78 to be fitted onto the end of the shaft 52 to facilitate rotation thereof.

Figure 5:
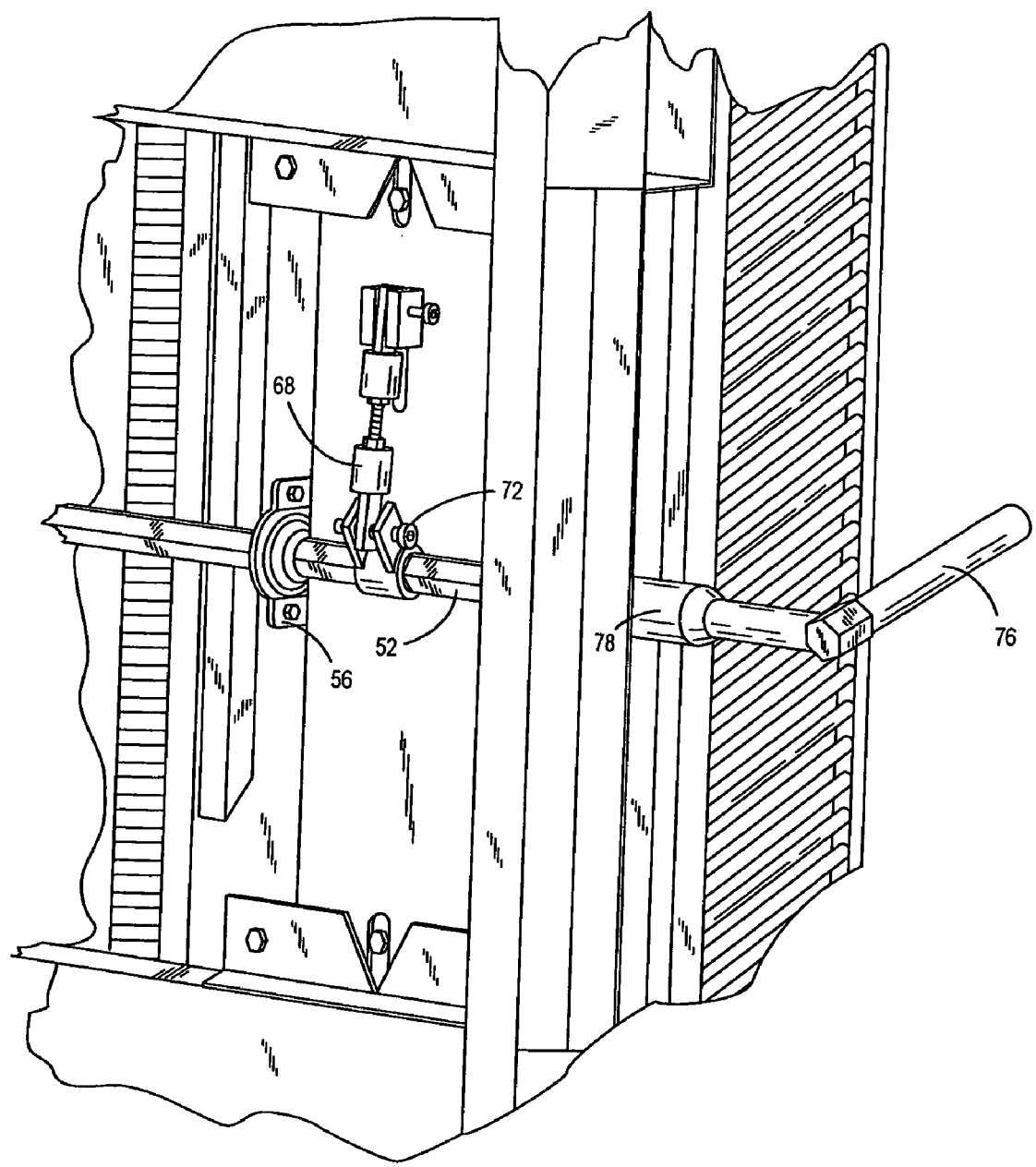
FIG. 5 is a bottom perspective view of one end of the rack showing a latching mechanism.

Also seen in FIGS. 4 and 5 are slots 80 and 82 formed through the bottom of the channels 36 and 38. Extending through the slots 80 and 82 are the parallel legs of clevis members 84 and 86. The legs of the clevis members 84 and 86 straddle a further arm member 88 and 90 and shoulder bolts, as at 92, pivotally join the arms 88 and 90 to the clevis members.

The shaft 54 seen in FIG. 3 is identical to shaft 52 in FIG. 4 and the same clevis arrangements and arms are moved when a crank is used to turn the shaft 54.

As seen in FIG. 6, a slotted plate 94 is disposed on the bottom surface of the channels 36, 38, 40 and 42 and the lower ends of the movable plates 50 reside in the parallel, transversely extending slots formed in plates 94. The legs of the devises 84 and 86 (FIG. 4) are welded to the undersurface of the plates 94 so as to project through the slots 80 and 82. It can be seen, then, that rotation of the shaft 52 in its bearings 56 and 58 will cause the slotted plates 94 in the channels 36 and 38 to shift in the width direction of the base assembly 12 and thereby tilt the movable plates 50. When turned in a first direction, the gap between the movable plates 50 and the fixed plates 48 is decreased while rotation of the shaft in the opposite direction will increase the size of the gap.

Again, the reader should understand that the mechanism for displacing the movable plates toward and away from the fixed plates is replicated for half of the rack assembly occupied by the A-frame 54 and the channels 40 and 42.

OPERATION

Having described in detail the structural make-up of the rack assembly, consideration will next be given to its mode of operation. With the rack assembly 10 sitting on the ground with the A-frames 54 and 56 erect and with the movable plates 50 displaced away from the fixed plates 48 so as to create a gap therebetween, individual sheets of glass or other fragile material to be transported are inserted between adjacent spacer bars 68 with the lower edge of the glass sheets being guided by the grooves formed in the cushion panels 44 and through the now-open gap between the fixed plates and movable plates. For longer glass sheets, they may extend through both A-frames, but for shorter sheets, they may only extend halfway along the length dimension of the base member 12.

Once the sheets have been so placed, the operator will use the crank 76 to sequentially rotate the shafts 52 and 54 and thereby affect closure of the movable plates 50 toward the stationary plates 48 and thereby gripping the lower edges of the several glass panels to firmly hold them against tipping or sliding. The polyethylene coating on the plates not only increases the frictional grip, but also inhibits chipping of the edge of the glass. Now, a worker can use a forklift to elevate the loaded rack assembly and place the rack on the bed of a semi-trailer for transport. The A-frames are designed to be structurally strong enough so that two of the rack assemblies 10 may be stacked one atop the other.

Because the individual glass sheets are effectively clamped against movement, tipping of the rack assembly during loading or unloading onto or from a semi-trailer does not result sliding or breaking of the fragile glass panels.

Once the shipment has reached its destination, the crank can again be used to unclamp the glass sheets, allowing them to be individually removed from the rack and used, say, in creating windows and the like.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A rack assembly for transporting and storing panels comprising:
    a. a base containing at least two sets of channels in which a plurality of panels can be placed;
    b. a pair of A-frame assemblies hinged to the base to provide angled support members relative to the base;
    c. at least one panel gripper assembly associated with each set of channels for engaging against stored panels; and
    d. a pair of linkage assemblies wherein one of said linkage assemblies separately controls the movement of the gripper assembly associated with one of the sets of channels and wherein the other linkage assembly controls the movement of the gripper assembly associated with the remaining set of channels.

2. The rack assembly as in claim 1 wherein the A-frame assemblies are collapsible onto a top surface of the base.

3. The rack assembly as in claim 2 wherein the A-frame assemblies form a triangular cross section with the base.

4. The rack assembly as in claim 1 wherein the pair of linkage assemblies includes a shaft for moving a pair of actuators governing movement of a plurality of gripper members of said gripper assemblies.

5. The rack assembly as in claim 4 wherein the pair of linkage assemblies is activated using cranks to rotate the shaft of the linkage assemblies that protrude from the base.

6. The rack assembly as in claim 1 wherein the base includes a pair of tubes spaced to receive forks of a forklift therein.

7. The rack assembly as in claim 1 wherein each of the sets of channels include two inverted channel members on either side of a center channel portion, the center channel portion containing gripper members and the inverted channel members containing cushion material on an upper surface.

8. The rack assembly as in claim 7 wherein the A-frame assemblies contain a plurality of parallel, spaced-apart bars between which panels are supported when the lower edges of the panels are disposed in slots of the cushion material.

9. The rack assembly as in claim 8 wherein spaces between adjacent ones of said bars in the A-frame assemblies, the slots in the cushion material and spaces between adjacent ones of said gripper members are aligned with one another.

* * * * *